United States Patent
Leng

(10) Patent No.: US 9,879,803 B2
(45) Date of Patent: Jan. 30, 2018

(54) CONNECTABLE CABLE ORGANIZER

(71) Applicant: Maxdao Limited, Taizhou, Jiangsu (CN)

(72) Inventor: Jun Hua Leng, Taizhou (CN)

(73) Assignee: Maxdao Limited, Taizhou (CN)

( * ) Notice: Subject to any disclaimer, the term of this patent is extended or adjusted under 35 U.S.C. 154(b) by 0 days.

(21) Appl. No.: 15/210,851

(22) Filed: Jul. 14, 2016

(65) Prior Publication Data

US 2017/0204995 A1    Jul. 20, 2017

(30) Foreign Application Priority Data

Jan. 14, 2016  (CN) .................. 2016 2 00335866 U

(51) Int. Cl.
*F16L 3/22* (2006.01)
*F16L 3/12* (2006.01)

(52) U.S. Cl.
CPC ............. *F16L 3/222* (2013.01); *F16L 3/1218* (2013.01); *F16L 3/1222* (2013.01)

(58) Field of Classification Search
CPC ....... F16L 3/222; F16L 3/1222; F16L 3/1218; B65D 61/00
USPC ................................ 248/63, 74.1, 74.2, 68.1
See application file for complete search history.

(56) References Cited

U.S. PATENT DOCUMENTS

| | | | | |
|---|---|---|---|---|
| 2,375,513 A * | 5/1945 | Bach | ....................... | F16L 3/221 248/59 |
| 3,066,903 A * | 12/1962 | Tinnerman | ................ | F16B 2/08 24/23 R |
| 3,185,418 A * | 5/1965 | Appleton | .................. | F16L 3/24 248/72 |
| 3,310,264 A * | 3/1967 | Appleton | .................. | F16L 3/12 248/72 |
| 3,526,381 A * | 9/1970 | Pepe | ......................... | F16L 3/10 248/71 |
| 4,119,285 A * | 10/1978 | Bisping | ..................... | F16L 3/13 248/222.12 |
| 4,479,625 A * | 10/1984 | Martz | ..................... | F16L 3/127 248/62 |
| 4,958,792 A * | 9/1990 | Rinderer | ................... | F16L 3/13 24/457 |
| 5,121,894 A * | 6/1992 | Twork, Sr. | ................ | F16L 3/13 248/316.7 |
| 5,921,520 A * | 7/1999 | Wisniewski | ............. | F16L 3/12 248/300 |

(Continued)

*Primary Examiner* — Muhammad Ijaz
(74) *Attorney, Agent, or Firm* — Raymond Y. Chan; David and Raymond Patent Firm

(57) ABSTRACT

A connectable cable organizer includes an organizing body, an organizing adapter having a through hole formed at the bottom side of the organizing body, two positioning panels upwardly and inclinedly extended from two sides of the bottom side of the organizing body for receiving a cable between the positioning panels, and two locking heads integrally and upwardly extended from top edges of the positioning panels. The cable is disposed at a cable retention space between the positioning panels, such that the cable is clamped between the positioning panels while the cable is slidable and rotatable at the cable retention space. Two connectable cable organizers are detachably coupled with each other by inserting the locking unit of one connectable cable organizer into the through hole of another connectable cable organizer to hold the cables side-by-side.

8 Claims, 2 Drawing Sheets

(56) References Cited

U.S. PATENT DOCUMENTS

| | | | | |
|---|---|---|---|---|
| 6,161,804 A * | 12/2000 | Paske | F16L 3/12 | 248/71 |
| 6,257,530 B1 * | 7/2001 | Tsai | F16L 3/127 | 248/73 |
| 6,354,543 B1 * | 3/2002 | Paske | F16L 3/12 | 211/85.18 |
| D461,396 S * | 8/2002 | Ferrill | D8/356 | |
| 6,899,305 B2 * | 5/2005 | Korczak | F16L 3/12 | 248/68.1 |
| 6,908,274 B1 * | 6/2005 | Vassiliou | F16B 37/02 | 411/173 |
| 7,090,174 B2 * | 8/2006 | Korczak | F16B 21/075 | 248/58 |
| 7,293,745 B2 * | 11/2007 | Catapano | F16L 3/222 | 248/61 |
| 7,568,868 B2 * | 8/2009 | Motsch | F16B 37/041 | 411/112 |
| 7,568,870 B2 * | 8/2009 | Paquet | F16B 37/043 | 411/125 |
| 7,874,775 B2 * | 1/2011 | Hullmann | B60R 11/00 | 24/295 |
| 8,011,621 B2 * | 9/2011 | Korczak | F16L 3/127 | 248/231.81 |
| 8,016,530 B2 * | 9/2011 | Johnson | F16B 37/043 | 411/173 |
| 8,277,158 B2 * | 10/2012 | Csik | F16B 37/046 | 411/111 |
| 8,439,316 B2 * | 5/2013 | Feige | F16L 3/13 | 248/71 |
| 8,459,598 B2 * | 6/2013 | Gardner | F16L 3/133 | 248/58 |
| 8,636,454 B2 * | 1/2014 | Okada | F16B 5/0642 | 24/295 |
| 2002/0005463 A1 * | 1/2002 | Paske | F16L 3/12 | 248/74.1 |
| 2003/0089828 A1 * | 5/2003 | Korczak | F16B 21/075 | 248/68.1 |
| 2005/0109887 A1 * | 5/2005 | Catapano | F16L 3/222 | 248/68.1 |
| 2005/0109890 A1 * | 5/2005 | Korczak | F16L 3/12 | 248/74.1 |
| 2006/0108480 A1 * | 5/2006 | Goodwin | F16L 3/1233 | 248/63 |
| 2006/0249633 A1 * | 11/2006 | Korczak | F16B 21/075 | 248/62 |
| 2009/0294602 A1 * | 12/2009 | Korczak | F16L 3/127 | 248/74.2 |
| 2010/0026028 A1 * | 2/2010 | Smith | B60R 13/0206 | 296/29 |
| 2011/0226913 A1 * | 9/2011 | Feige | F16L 3/13 | 248/74.2 |
| 2013/0248534 A1 * | 9/2013 | Dang | B65D 50/00 | 220/484 |
| 2014/0061412 A1 * | 3/2014 | Suzuki | H02G 3/30 | 248/226.11 |
| 2014/0306071 A1 * | 10/2014 | Stechmann | H02G 3/32 | 248/74.1 |

* cited by examiner

CONNECTABLE CABLE ORGANIZER

CROSS REFERENCE OF RELATED APPLICATION

This is a non-provisional application that claims priority to Chinese application number 2016200335866, filing date Jan. 14, 2016, the entire contents of each of which are expressly incorporated herein by reference.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a cable clipping apparatus, and more particular to a connectable cable organizer that can quickly retain the cable and to allow the cable to be rotated freely.

Description of Related Arts

Cables, such as electric cables and signal cables, are commonly construed to have one or more conductor wires enclosed within an insulating barrier for power and/or signal transmission. Due to the relatively long length of the cable, a cable clip is used for securing and retaining the cable in place. However, the existing cable clip has several drawbacks. The existing cable clip generally has a complicated structure to fasten with the cable, such that the fastening operation and the unfastening operation of the existing cable clip are relatively complicated. Thus, the manufacturing cost and process of the existing cable clip is relatively high and complicated due to its structure, such that the existing cable clip cannot be mass produced. In addition, the major problem of the existing cable clip is that since the cable must be securely retained by the existing cable clip, the cable cannot be rotated with respect to the existing cable clip. In particular, the existing cable clip will further provide an anti-rotation structure to prevent an rotational movement of the cable once it is fastened by the existing cable clip. However, during the wiring configuring process, the cable is needed for being rotated to extend the cable from place to place. In other words, when the cable is forced to rotate, the outer surface of the cable, i.e. the insulating barrier, will be damaged by the existing cable clip. As a result, the conductor wires will be exposed and will not be protected by the insulating barrier at all.

SUMMARY OF THE PRESENT INVENTION

In order to solve the above issues, the present invention provides a connectable cable organizer that is convenient for holding the cable in position and for removing the cable from the cable organizer. The cable organizer of the present invention has a simple structure that can be easily manufactured and can securely hold the cable without damaging the cable.

The present invention provides a connectable cable organizer, which comprises an organizing body having a U-shaped cross section, an organizing adapter which has a through hole formed at a bottom side of the organizing body, and a positioning unit which comprises two positioning panels upwardly and inclinedly extended from two sides of the bottom side of the organizing body for receiving the cable between the positioning panels. The connectable cable organizer further comprises a locking unit which comprises two locking heads integrally and upwardly extended from top edges of the positioning panels.

As a further improvement of the present invention, the organizing adapter further comprises a reinforcing rim formed at the bottom side of the organizing body around a peripheral edge of the through hole.

As a further improvement of the present invention, the two supporting walls are inwardly extended from inner sides of the positioning panels respectively, wherein a width of each of the locking heads is slightly smaller than a size of the through hole.

As a further improvement of the present invention, each of the positioning panels is constructed to have a first positioning wall perpendicularly extended from the bottom side of said organizing body and a second positioning wall integrally, inclinedly and inwardly extended from a top edge of the first positioning wall. A space is formed between two inner edges of said supporting walls. Each of the positioning panels further comprises a third positioning wall integrally extended from a top edge of the second positioning wall. The retention grooves are inwardly formed at the top edge of the third positioning wall, wherein the retention groove has a concave configuration inwardly bent at the top edge of the third positioning wall to define a cable retention space below the retention grooves, above the supporting walls, and between the third positioning walls for matching with a diameter size of the cable.

In one embodiment, the locking unit further comprises two reinforcing ribs outwardly extended from two side edges of each of the locking heads, and a plurality of guiding walls bent outwardly from the top edge of the positioning panels, wherein each of the locking heads is located between two of the guiding walls.

The advantages the present invention are shown as follows:

The structure and design of the present invention is simple, easy to manufacture with low production cost, and convenient for installation and disassembly. Due to the integrated structural configuration, there is no cutting point on the positioning unit. Therefore, the cable can be slid or rotate for cable positioning adjustment after the cable is held by the positioning unit so as to prevent any damage of the cable. The overall structure is compact that multiple connectable cable organizers can be interconnected with each other, so as to ensure the reliability of the connection. The organizing body, the organizing adapter, the positioning unit, and the locking unit are integrated to form a single configuration so as to ensure the stability of the connection and securing of the cable. Since the reinforcing rim is formed around the peripheral edge of the through hole to engage with the reinforcing ribs, the connection between two connectable cable organizers can be stabilized and ensured. The match between the locking head and the organizing adapter will enhance the firmness of the connection between two connectable cable organizers.

The first positioning walls are perpendicularly extended from the bottom side of the organizing body and the second positioning walls are integrally, inclinedly and inwardly extended from the top edges of the first positioning walls. A space is formed between two inner edges of said supporting walls. The third positioning walls are integrally extended from the top edges of the second positioning walls, wherein the two third positioning walls are upwardly and perpendicularly extended with respect to the bottom side of the organizing body. The retention grooves are inwardly formed at the top edges of the third positioning walls, wherein the cable retention space is formed below the retention grooves, above the supporting walls, and between the third positioning walls for matching with the diameter size of the cable. As a result, the entire device meets the required design and standard, which is simple and stable. The reinforcing ribs are outwardly extended from two side edges of each of the locking heads to stabilize and ensure the connection between two connectable cable organizers. Since the guiding walls bent outwardly from the top edge of the positioning panels, the guiding walls the cable organizer will bias against the bottom side of the organizing body of another cable organizer, so as to prevent any wobbling movement between the two cable organizers and to enhance the stabilization between the two cable organizers.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

The following further describes the present invention in detail with appended figures.

Figure 1:
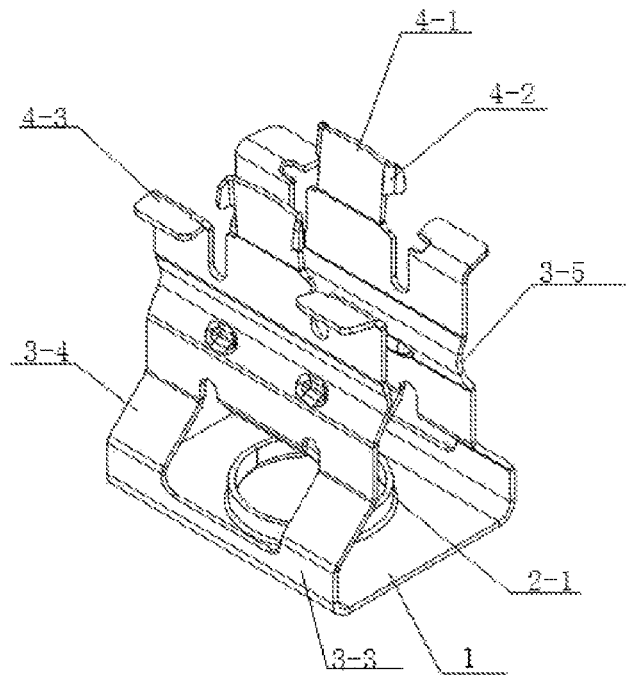
FIG. 1 is a perspective view of a cable organizer according to a preferred embodiment of the present invention.
Figure 2:
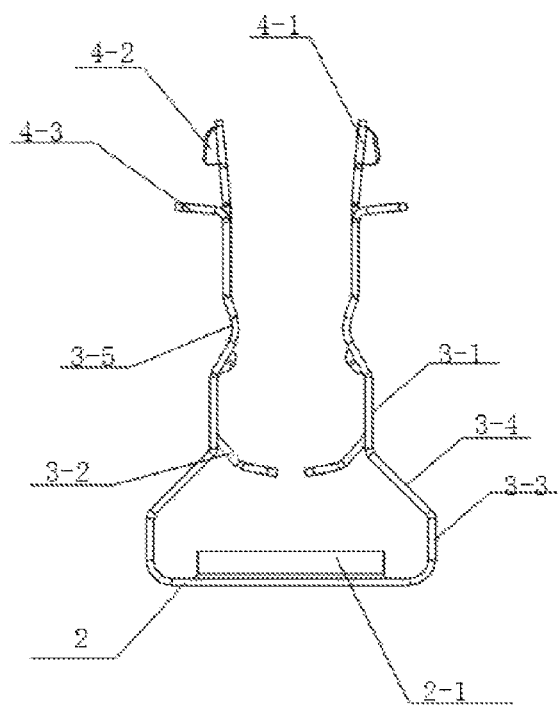
FIG. 2 is a side view of the cable organizer according to the above preferred embodiment of the present invention.
Figure 3:
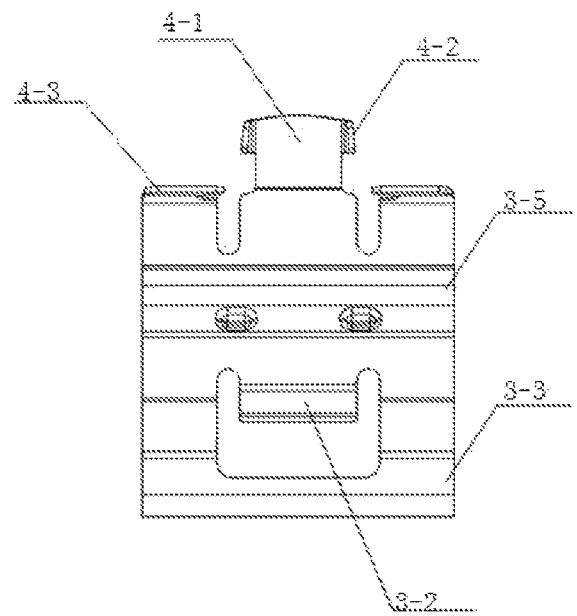
FIG. 3 is a front view of the cable organizer according to the above preferred embodiment of the present invention.
Figure 4:
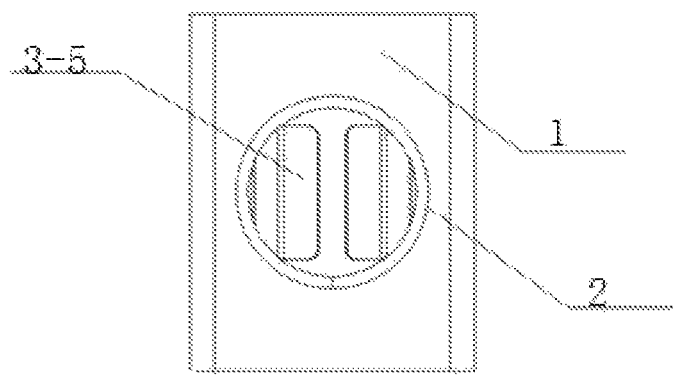
FIG. 4 is a bottom view of the cable organizer according to the above preferred embodiment of the present invention.

Referring to FIGS. 1 to 4 of the drawings, a cable organizer comprises an organizing body 1 generally having a U-shaped cross section, an organizing adapter 2 provided at a bottom side of the organizing body 1, a positioning unit upwardly extended from two sides of the bottom side of the organizing body 1, and a locking unit. The organizing adapter 2 has a through hole formed at the bottom side of the organizing body 1. The positioning unit comprises two positioning panels integrally, symmetrically and upwardly from the organizing body 1 to define a space therebetween, wherein the positioning panels are inclinedly and inwardly extended from the two sides of the bottom side of the organizing body 1 toward each other. The positioning panels are bendable toward each other. The locking unit comprises a locking head 4-1 integrally and upwardly extended from a top edge of each of the positioning panels.

The organizing adapter 2 further comprises a reinforcing rim 2-1 upwardly formed at the bottom side of the organizing body 1 around a peripheral edge of the through hole. The cable organizer further comprises two supporting walls 3-2 integrally and inwardly extended from inner sides of the positioning panels respectively. A width of each of the locking heads 4-1 is slightly smaller than a size of the through hole, such that the locking heads 4-1 can be inserted through the through hole of another cable organizer. Each of the positioning panels is constructed to have a first positioning wall 3-3 and a second positioning wall 3-4. Each of the first positioning walls 3-3 is perpendicularly extended from the bottom side of the organizing body 1. The second positioning walls 3-4 are integrally, inclinedly and inwardly extended from top edges of the first positioning walls 3-3 respectively. Each of the positioning panels further comprises a third positioning wall 3-1 upwardly and perpendicularly extended with respect to the bottom side of the organizing body 1, wherein the two third positioning walls 3-1 are integrally extended from top edges of the second positioning walls 3-4 respectively, such that the third positioning walls 3-1 are parallel to the first positioning walls 3-3. The supporting walls 3-2 are integrally, horizontally, and inwardly extended from bottom edges of the second positioning walls 3-4 respectively and are aligned with each other, wherein a gap is formed between two inner edges of the supporting walls 3-2. Each of the positioning panels further has a retention groove 3-5 inwardly formed at a top edge of the third positioning wall 3-1, wherein the retention groove 3-5 has a concave configuration inwardly bent at the top edge of the third positioning wall 3-1. A cable retention space is formed below the retention grooves 3-5, above the supporting walls 3-2, and between the third positioning walls 3-1 for matching with a diameter size of the cable so as to accommodate the cable in the cable retention space. The locking unit further comprises two reinforcing ribs 4-2 outwardly extended from two side edges of each of the locking heads 4-1, and a plurality of guiding walls 4-3 bent outwardly from the top edge of the positioning panels, wherein each of the locking heads 4-1 is located between two of the guiding walls 4-3.

In order to use the cable organizer of the present invention, a portion of the cable, having a corresponding diameter, is disposed at the cable retention space of the cable organizer through an opening between the positioning panels, such that the cable is clamped below the retention grooves 3-5, above the supporting walls 3-2, and between the third positioning walls 3-1 while the cable can be slid or freely rotate at the cable retention space. Then, the locking heads 4-1 can be pressed toward each other to close the opening and can be inserted into the through hole of another cable organizer. As a result, two cables are individually retained by two cable organizers and the cable organizers are detachably coupled with each other to hold the cables side-by-side, so as to complete the cable organizing process. It is worth mentioning that after the locking heads 4-1 of one cable organizer are inserted through the through hole of another cable organizer, the locking heads 4-1 are bounced back to engage the reinforcing ribs 4-2 with the reinforcing rim 2-1. In addition, after the locking heads 4-1 of one cable organizer are inserted through the through hole of another cable organizer, the guiding walls 4-3 of the cable organizer will bias against the bottom side of the organizing body 1 of another cable organizer, so as to prevent any wobbling movement between the two cable organizers and to enhance the stabilization between the two cable organizers, and to enhance the strength of the engagement between the two cable organizers.

One skilled in the art will understand that the embodiment of the present invention as shown in the drawings and described above is exemplary only and not intended to be limiting. It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A connectable cable organizer arrangement for a cable, comprising:
   an organizing body having a bottom side;
   an organizing adapter provided at said bottom side of said organizing body, wherein said organizing adapter has a through hole;
   a positioning unit which comprises two positioning panels, wherein each of said two positioning panels has a first positioning wall perpendicularly extended from said bottom side of said organizing body, a second positioning wall integrally, inclinedly and inwardly extended from a top edge of said first positioning wall, and a third positioning wall integrally extended from a top edge of said second positioning wall, wherein said third positioning wall of each of said positioning panels is parallel to said first positioning wall thereof, wherein each of said positioning panels further has a retention groove inwardly formed at a top edge of said third positioning wall;
   two supporting walls inwardly extended from inner sides of said positioning panels respectively, wherein said retention groove has a concave configuration inwardly bent at said top edge of said third positioning wall such that a respective cable retention space for supporting the cable therein is defined between each of said retention grooves of said positioning panels and said supporting walls to receive the cable between said positioning panels; and
   a locking unit which comprises two locking heads integrally and upwardly extended from said respective top edges of said positioning panels, wherein a width of each of said locking heads is slightly smaller than a size of said through hole, such that said locking heads of one connectable cable organizer are capable of being inserted through said through hole of another connectable cable organizer and two said connectable cable organizers are capable of being detachably interconnected with each other.

2. The connectable cable organizer arrangement, as recited in claim 1, wherein said supporting walls are inclinedly and inwardly extended from bottom edges of said third positioning walls respectively and are aligned with each other to define a space therebetween such that said cable retention space is defined between said second positioning walls.

3. The connectable cable organizer arrangement, as recited in claim 2, wherein said locking unit further comprises a plurality of guiding walls bent outwardly from respective top edges of said positioning panels and two reinforcing ribs outwardly extended from two side edges of each of said locking heads, and said organizing adapter further comprises a reinforcing rim formed at said bottom side of said organizing body around a peripheral edge of said through hole, wherein when said locking heads of said locking unit of one of two said cable organizers are inserted through said through hole of said organizing adapter of another of said two cable organizers, said reinforcing ribs of said locking unit of one of two said cable organizers are capable of being engaged with said reinforcing rim of said organizing adapter of another of said two cable organizers and said guiding walls of one of said two cable organizers are bias against said bottom side of said organizing body of another of said two cable organizers, so as to stably arrange the organizing adapter and the organizing body one of said two cable organizers between said reinforcing ribs and said guiding walls of said locking unit another of said two cable organizers and prevent any wobbling movement between said two cable organizers.

4. The connectable cable organizer arrangement, as recited in claim 3, wherein each of said locking heads is located between two of said guiding walls.

5. The connectable cable organizer arrangement, as recited in claim 4, wherein said organizing body, said organizing adapter, said positioning unit, and said locking unit are integrated to form a single configuration.

6. The connectable cable organizer arrangement, as recited in claim 1, wherein said locking unit further comprises a plurality of guiding walls bent outwardly from said respective top edges of said positioning panels and two reinforcing ribs outwardly extended from two side edges of each of said locking heads, and said organizing adapter further comprises a reinforcing rim formed at said bottom side of said organizing body around a peripheral edge of said through hole, wherein when said locking heads of said locking unit of one of said two cable organizers are inserted through said through hole of said organizing adapter of another of said two cable organizers, said reinforcing ribs of said locking unit of one of two said cable organizers are capable of being engaged with said reinforcing rim of said organizing adapter of another of said two cable organizers and said guiding walls of one of said two cable organizers are bias against said bottom side of said organizing body of another of said two cable organizers, so as to stably arrange the organizing adapter and the organizing body one of said two cable organizers between said reinforcing ribs and said guiding walls of said locking unit another of said two cable organizers and prevent any wobbling movement between said two cable organizers.

7. The connectable cable organizer arrangement, as recited in claim 1, wherein each of said locking heads is located between two guiding walls.

8. The connectable cable organizer arrangement, as recited in claim 1, wherein said organizing body, said organizing adapter, said positioning unit, and said locking unit are integrated to form a single configuration.

* * * * *